US012647483B2

(12) United States Patent
Jain et al.

(10) Patent No.: US 12,647,483 B2
(45) Date of Patent: Jun. 2, 2026

(54) SYSTEM AND METHOD TO DYNAMICALLY MODIFY AVAILABILITY OF NETWORK RESOURCES

(71) Applicant: Bank of America Corporation, Charlotte, NC (US)

(72) Inventors: Mohit Jain, Hyderabad (IN); Manikandan Rajaraman, Chennai (IN); Vijay Kumar Yarabolu, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 69 days.

(21) Appl. No.: 18/898,211

(22) Filed: Sep. 26, 2024

(65) Prior Publication Data

US 2026/0089212 A1 Mar. 26, 2026

(51) Int. Cl.
H04L 67/1097 (2022.01)
H04L 47/80 (2022.01)

(52) U.S. Cl.
CPC ........ H04L 67/1097 (2013.01); H04L 47/805 (2013.01)

(58) Field of Classification Search
None
See application file for complete search history.

(56) References Cited

U.S. PATENT DOCUMENTS

| | | | |
|---|---|---|---|
| 6,775,686 | B1 | 8/2004 | Bellon |
| 8,965,947 | B2 | 2/2015 | Drebinger et al. |

| | | | | |
|---|---|---|---|---|
| 10,623,386 | B1 | 4/2020 | Bernat et al. | |
| 11,030,169 | B1 * | 6/2021 | Wu | G06F 16/22 |
| 11,093,146 | B2 | 8/2021 | Karr et al. | |
| 11,133,076 | B2 | 9/2021 | Karr et al. | |
| 11,281,394 | B2 | 3/2022 | Hankins et al. | |
| 11,748,633 | B2 | 9/2023 | Callcut et al. | |
| 11,770,296 | B2 | 9/2023 | Nolan et al. | |
| 12,271,278 | B2 * | 4/2025 | Chipman | G06F 16/25 |

(Continued)

OTHER PUBLICATIONS

Delaney Van Wilpe, Revenue offices can now issue new licenses after temporary nationwide outage, Article, Mar. 21, 2024, pp. 1-5.

(Continued)

*Primary Examiner* — Quang N Nguyen

(57) ABSTRACT

A system comprises a memory communicatively coupled to at least one processor. The at least one processor is configured to receive a request for data sharding operations from a user device, determine a node comprising multiple network resources configured to create a response to the request, receive sharding feedback from the node, execute the machine learning algorithm to determine whether the performance of the network resources match a predefined performance threshold, generate a proposed sharding strategy to increase the network resources at the node in response to determining that the performance of the network resources does not match the predefined performance threshold, provide the proposed sharding strategy to the node for implementation, and generate multiple sharding commands configured to control routing of data between the first node and the user device in response to receiving the access command; and route the request to the node using the sharding commands.

20 Claims, 3 Drawing Sheets

(56) References Cited

U.S. PATENT DOCUMENTS

| | | | |
|---|---|---|---|
| 12,380,130 B2* | 8/2025 | Wong .................. | G06F 16/2343 |
| 12,413,521 B1* | 9/2025 | Nagesh ................ | H04L 47/122 |
| 2013/0031094 A1* | 1/2013 | Kozak .................. | G06F 16/951 |
| | | | 707/E17.089 |
| 2019/0102476 A1* | 4/2019 | Liu ......................... | G06F 16/86 |
| 2020/0311559 A1 | 10/2020 | Chattopadhyay et al. | |
| 2021/0110310 A1 | 4/2021 | Bernat et al. | |
| 2022/0300198 A1 | 9/2022 | Gao et al. | |
| 2022/0344049 A1 | 10/2022 | Hall et al. | |
| 2023/0334316 A1 | 10/2023 | Koker et al. | |
| 2024/0103594 A1 | 3/2024 | Cella et al. | |
| 2024/0273077 A1* | 8/2024 | Zeng .................. | G06F 16/2282 |

OTHER PUBLICATIONS

4 Instructive Postmortems on Data Downtime and Loss, Article, Mar. 1, 2024, pp. 1-11.

* cited by examiner

System 100

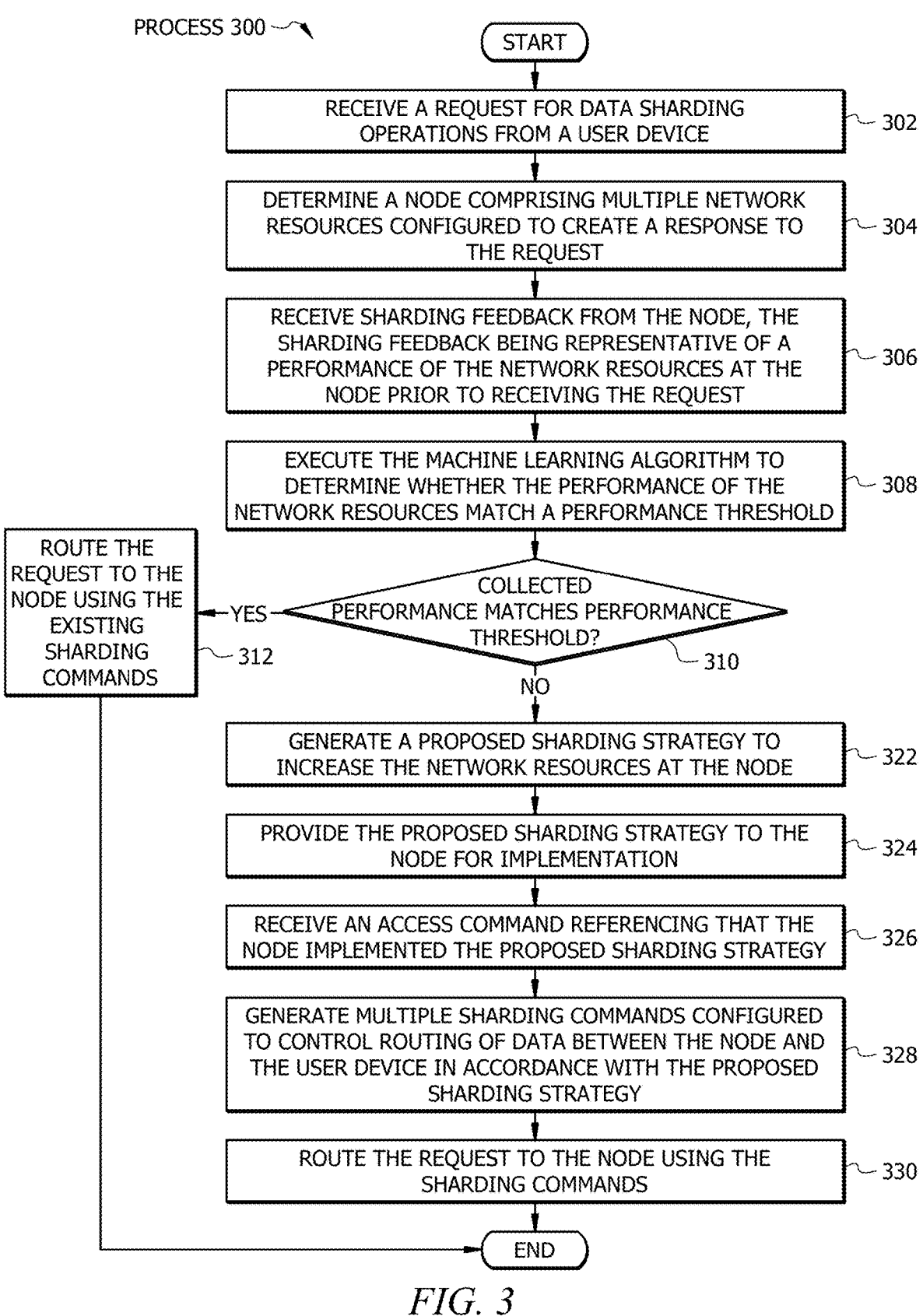

PROCESS 300

START

RECEIVE A REQUEST FOR DATA SHARDING OPERATIONS FROM A USER DEVICE ⌐ 302

DETERMINE A NODE COMPRISING MULTIPLE NETWORK RESOURCES CONFIGURED TO CREATE A RESPONSE TO THE REQUEST ⌐ 304

RECEIVE SHARDING FEEDBACK FROM THE NODE, THE SHARDING FEEDBACK BEING REPRESENTATIVE OF A PERFORMANCE OF THE NETWORK RESOURCES AT THE NODE PRIOR TO RECEIVING THE REQUEST ⌐ 306

EXECUTE THE MACHINE LEARNING ALGORITHM TO DETERMINE WHETHER THE PERFORMANCE OF THE NETWORK RESOURCES MATCH A PERFORMANCE THRESHOLD ⌐ 308

ROUTE THE REQUEST TO THE NODE USING THE EXISTING SHARDING COMMANDS ⌐ 312

COLLECTED PERFORMANCE MATCHES PERFORMANCE THRESHOLD? ⌐ 310

YES

NO

GENERATE A PROPOSED SHARDING STRATEGY TO INCREASE THE NETWORK RESOURCES AT THE NODE ⌐ 322

PROVIDE THE PROPOSED SHARDING STRATEGY TO THE NODE FOR IMPLEMENTATION ⌐ 324

RECEIVE AN ACCESS COMMAND REFERENCING THAT THE NODE IMPLEMENTED THE PROPOSED SHARDING STRATEGY ⌐ 326

GENERATE MULTIPLE SHARDING COMMANDS CONFIGURED TO CONTROL ROUTING OF DATA BETWEEN THE NODE AND THE USER DEVICE IN ACCORDANCE WITH THE PROPOSED SHARDING STRATEGY ⌐ 328

ROUTE THE REQUEST TO THE NODE USING THE SHARDING COMMANDS ⌐ 330

END

*FIG. 3*

SYSTEM AND METHOD TO DYNAMICALLY MODIFY AVAILABILITY OF NETWORK RESOURCES

TECHNICAL FIELD

The present disclosure relates generally to sharding operations, and more specifically to a system and method to dynamically modify availability of network resources.

BACKGROUND

In communication systems, the organic increase in digital data volume has led to a wide acceptance and adoption of data systems. The rate of growth of compute and storage capabilities of an individual network device has not been able to keep up to a pace of growth of digital data. In this regard, network devices are not dependable at providing and/or maintaining large storages of information because traffic at a specific network device may cause communications from the specific network device to be compromised. For example, communications at a network device storing data for a large set of additional network devices may be unable to effectively partition and/or allocate the data such that it is accessible for usage in the network.

SUMMARY OF THE DISCLOSURE

In one or more embodiments, systems and methods are configured to dynamically modify availability of network resources to perform one or more sharding operations in a network. In particular, the systems may be configured to train a machine learning (ML) model to determine and/or predict routing needs in the network. The system may be configured to receive requests for data shards from user devices, determine routing paths to sharding nodes configured to process the data shards, and trigger data sharding operations between the user devices and the sharding nodes. The system may be configured to distribute data evenly among the sharding nodes during a set up and/or initiation phase. The system may be configured to dynamically evaluate performance of network resources at each sharding node to determine traffic loads in the network. The system may be configured to rebalance data distribution across the multiple sharding nudes based on determined traffic loads. Herein, the system may be configured to increase, reduce, and/or maintain allocations of network resources in one or more of the sharding nodes. These modifications may be performed in response to determining user devices (e.g., tenants) requesting data from specific sharding nodes, one or more data retrieving patterns, and/or current traffic bottlenecks in the network.

In one or more embodiments, the system described herein are integrated into a practical application of dynamically modifying network resources assigned to perform one or more data sharding operations at one or more sharding nodes. In some embodiments, the system reduces traffic loads at sharding nodes by performing one or more shard ensemble operations. The shard ensemble operations may comprise dynamically determining a sharding strategy at each sharding node (e.g., at a node level) based on type of data held and data access patterns handled by each sharding node. The system may be configured to track sharding operations and evaluate usage efficiency of the network resources at each sharding node. Herein, practical applications include rebalancing data shared among multiple sharding nodes to reduce traffic loads at any one specific sharding node (e.g., hotspots in the network). A hotspot is a term referring to a condition in which a cluster with multiple nodes is not balanced. Some nodes may be overspent in terms of processing, network bandwidth usage, memory usage and the like because of uneven distribution of workload.

In one or more embodiments, the system is directed to improvements in computer systems. Specifically, the system reduces processor and memory usage in servers and/or sharding nodes by quickly identifying imbalances in the network and/or proactively reducing traffic loads at specific sharding nodes. In particular, the system may be configured to reduce memory usage by inhibiting and/or avoiding network resources from being wasted retrieving data and/or restoring shards in specific sharding nodes during heavy traffic loads. Instead, the system may be configured to retrieve sharding feedback indicating performance of network resources in one or more of the sharding nodes and dynamically rebalance shard assignments among the sharding nodes to prevent, inhibit, reduce, and/or eliminate downtime in the network. Herein, the system may be configured to reallocate sharding operations in accordance with a dynamically changing sharding strategy instead of relying on lookup sharding strategies, range sharding strategies, and/or hash sharding strategies among others.

In one or more embodiments, the systems may comprise an apparatus, such as the server. Further, the system may be a data exchange system, which comprises the apparatus. In addition, the system may be configured to perform operations as part of a process performed by the apparatus. As a non-limiting example, the system may comprise a memory and at least one processor communicatively coupled to one another. The memory may be operable to store a machine learning algorithm configured to modify one or more sharding operations in accordance with one or more machine learning models. The at least one processor may be configured to receive a request for data sharding operations from a user device, determine a node comprising multiple network resources configured to create a response to the request, and receive sharding feedback from the node. The sharding feedback may be representative of a performance of the network resources at the node prior to receiving the request. Further, the at least one processor may be configured to execute the machine learning algorithm to determine whether the performance of the network resources match a predefined performance threshold, generate a proposed sharding strategy to increase the network resources at the node in response to determining that the performance of the network resources does not match the predefined performance threshold, provide the proposed sharding strategy to the node for implementation, receive an access command referencing that the node implemented the proposed sharding strategy, and generate multiple sharding commands configured to control routing of data between the first node and the user device in response to receiving the access command. The sharding commands may be configured to perform the data sharding operations in accordance with the proposed sharding strategy. The at least one processor may be configured to route the request to the node using the sharding commands.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 3 illustrates an example flowchart of a method to perform the operational flow of FIG. 2 in accordance with one or more embodiments.

DETAILED DESCRIPTION

Figure 1:
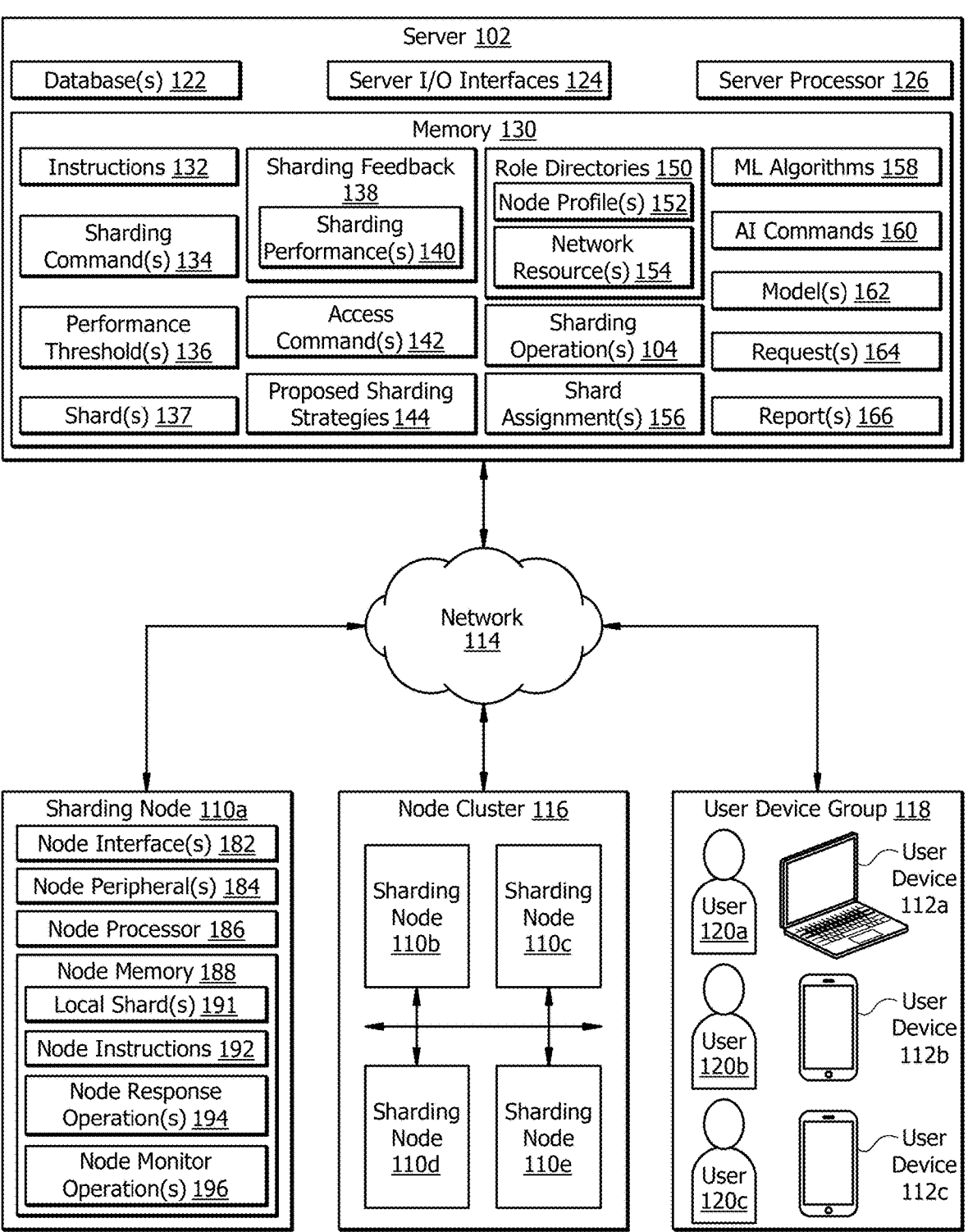
FIG. 1 illustrates a system in accordance with one or more embodiments.
Figure 2:
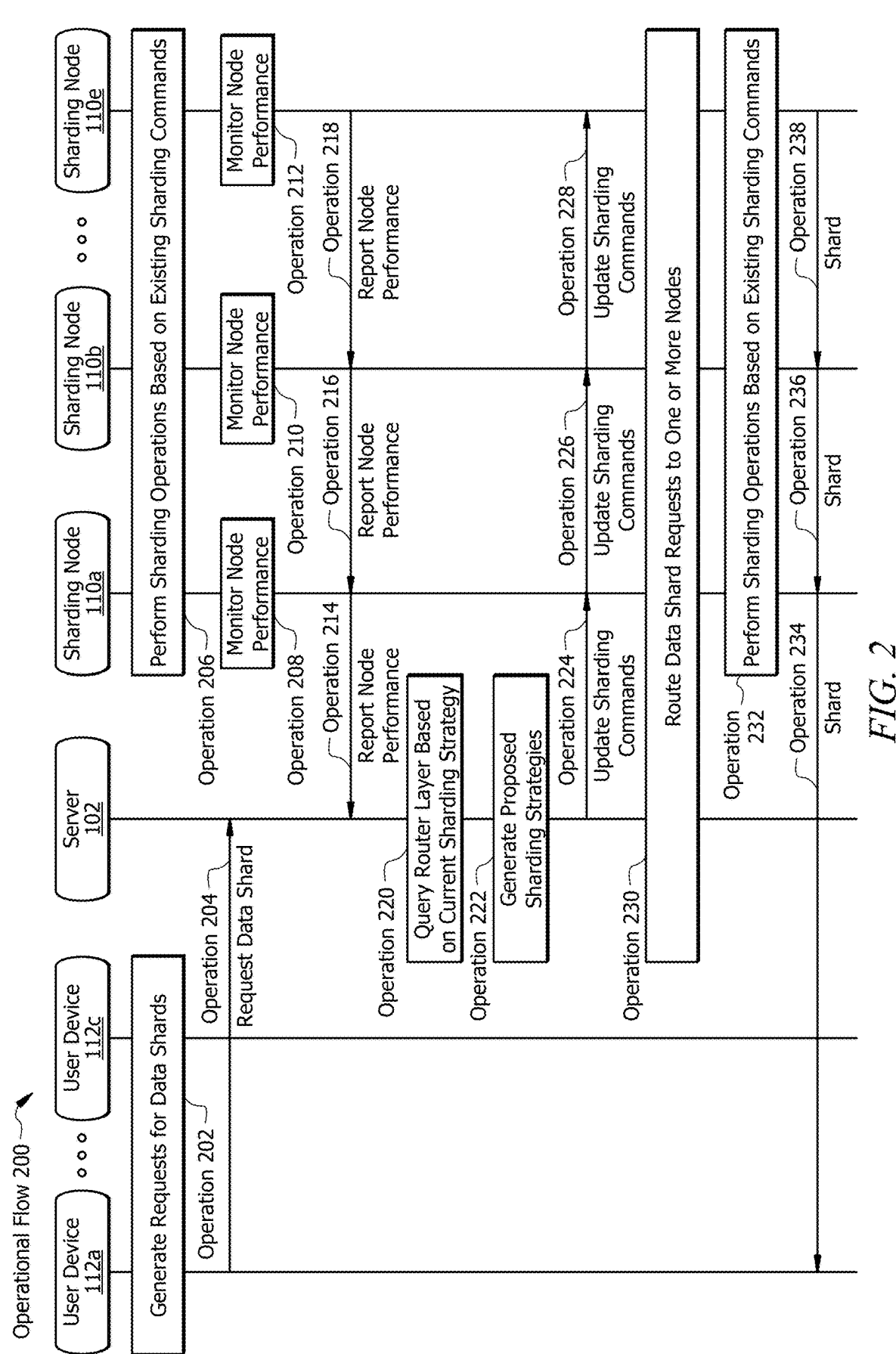
FIG. 2 illustrates an operational flow performed by the system of FIG. 1 in accordance with one or more embodiments.

As described above, this disclosure provides various systems and methods to dynamically modify availability of network resources. FIG. 1 illustrates a system 100 in which a server 102 configured to perform one or more sharding operations 104. FIG. 2 illustrates an operational flow 200 performed by the system 100 of FIG. 1. FIG. 3 illustrates a process 300 performed by the system 100 of FIG. 1.

System Overview

FIG. 1 illustrates an example system 100, in accordance with one or more embodiments. The system 100 may comprise a server 102 configured to perform one or more sharding operations 104. The system 100 includes a server 102 communicatively coupled to a sharding node 110a, a sharding node 110b, a sharding node 110c, a sharding node 110d, and a sharding node 110e (collectively, sharding nodes 110) and a user device 112a, a user device 112b, and a user device 112c (collectively, user devices 112) via a network 114. The sharding nodes 110 may be network nodes configured to create data shards, trigger exchanges of the data shards, and/or perform one or more communication operations with the server 102 and/or the user devices 112 via the network 114. The sharding nodes 110 may be network nodes configured to receive instructions to perform one or more of the sharding operations 104 based on instructions received from the server 102. In some embodiments, some of the sharding nodes 110 may be clustered together in one or more node clusters 116. The user devices 112 may be user nodes configured to trigger exchanges of data and/or perform one or more communication operations with the server 102 and/or the sharding nodes 110 via the network 114. The user devices 112 may be working nodes configured to receive instructions to perform one or more communication operations based on instructions received from the server 102. In some embodiments, some of the user devices 112 may be clustered together in one or more user device groups 118. Each of the user devices 112 may be associated with one or more corresponding operators. These operators are shown as a user 120a, a user 120b, and a user 120c (collectively, users 120) in the user device groups 118. In FIG. 1, the user device group 118 is shown comprising the user 120a associated with the user device 112a, the user 120b associated with the user device 112b, and the user 120c associated with the user device 112c.

In one or more embodiments, the server 102 may comprise one or more databases 122, one or more server input (I)/output (O) interfaces 124, at least one server processor 128, and at least one memory 130 communicatively coupled to one another. In some embodiments, the memory 130 may comprise instructions 132, one or more sharding commands 134, one or more performance thresholds 136, one or more shards 137, one or more sharding feedback 138 comprising one or more sharding performances 140 of one or more network resources 154 in one or more one or more sharding nodes 110, one or more access commands 142, one or more proposed sharding strategies 144, one or more role directories 150 comprising one or more node profiles 152 and one or more network resources 154 for each of the one or more sharding nodes 110, the one or more sharding operations 104, one or more shard assignments 156, one or more artificial intelligence (AI) commands 160, one or more machine learning (ML) algorithms 158 configured to train one or more models 162, one or more requests 164, and one or more reports 166.

Referring to the sharding node 110a a non-limiting example, the sharding node 110a may comprise one or more node interfaces 182, one or more node peripherals 184, at least one node processor 186, and at least one node memory 188 communicatively coupled to one another. The node memory 188 may comprise one or more local shards 191, node instructions 192, one or more node response operations 194, and/or one or more node monitor operations 196.

System Components

Server

The server 102 is generally any device or apparatus that is configured to process data and communicate with computing devices (e.g., the sharding nodes 110 and/or the user devices 112), additional databases, systems, and the like, via the one or more server I/O interfaces 124 (i.e., a user interface or a network interface). The server 102 may comprise the server processor 126 that is generally configured to oversee operations of a processing engine. The operations of the processing engine are described further below in conjunction with the system 100 described in FIG. 1, the operational flow 200 in FIG. 2, and the process 300 described in FIG. 3.

The server 102 comprises multiple databases 122 configured to provide one or more memory resources to the server 102, the sharding nodes 110, and/or the user devices 112. The server 102 comprises the server processor 126 communicatively coupled with the databases 122, the server I/O interfaces 124, and the memory 130. The server 102 may be configured as shown, or in any other configuration. In one or more embodiments, the databases 122 are configured to store data that enables the server 102 to configure, manage and coordinate one or more middleware systems. In some embodiments, the databases 122 store data used by the server 102 to function as a halfway point in between one or more services and other tools or databases.

In one or more embodiments, the server I/O interfaces 124 may be configured to enable wired and/or wireless communications. The server I/O interfaces 124 may be configured to communicate data between the server 102 and other user devices (i.e., the user devices 112), network devices (i.e., routers in the network 114), systems, or domain(s) via the network 114. For example, the server I/O interfaces 124 may comprise a WI-FI interface, a LAN interface, a WAN interface, a modem, a switch, or a router. The server processor 126 may be configured to send and receive data using the server I/O interfaces 124. The server I/O interfaces 124 may be configured to use any suitable type of communication protocol. In some embodiments, the server I/O interfaces 124 may be an admin console comprising a web browser-based or graphical user interface used to manage a middleware server domain via the server 102. A middleware server domain may be a logically related group of middleware server resources that managed as a unit. A middleware server domain may comprise the server 102 and one or more managed servers. The managed servers may be standalone devices and/or collected devices in the server cluster. The server cluster may be a group of managed servers that work together to provide scalability and higher availability for the services. In this regard, the services are developed and deployed as part of at least one domain. In other embodiments, one instance of the managed servers in the middleware server domain may be configured as the server 102. The server 102 provides a central point for managing and configure the managed servers and any of the one or more services.

The server processor 126 comprises one or more processors communicatively coupled to the memory 130. The server processor 126 may be any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The server processor 126 may be a programmable logic device, a microcontroller, a microprocessor, or any suitable combination of the preceding. The one or more server processor 126 are configured to process data and may be implemented in hardware or software executed by hardware. For example, the server processor 126 may be 8-bit, 16-bit, 32-bit, 64-bit or of any other suitable architecture. The server processor 126 may include an arithmetic logic unit (ALU) for performing arithmetic and logic operations, processor registers that supply operands to the ALU and store the results of ALU operations, and a control unit that fetches the instructions 132 from the memory 130 and executes them by directing the coordinated operations of the ALU, registers and other components. In this regard, the one or more server processor 126 are configured to execute various instructions. For example, the one or more server processor 126 are configured to execute the instructions 132 to implement the functions disclosed herein, such as some or all of those described with respect to FIGS. 1-3. In some embodiments, the functions described herein are implemented using logic units, FPGAs, ASICs, DSPs, or any other suitable hardware or electronic circuitry.

In one or more embodiments, the server I/O interfaces 124 may be any suitable hardware and/or software to facilitate any suitable type of wireless and/or wired connection. These connections may include, but not be limited to, all or a portion of network connections coupled to the Internet, an Intranet, a private network, a public network, a peer-to-peer network, the public switched telephone network, a cellular network, a local area network (LAN), a metropolitan area network (MAN), a wide area network (WAN), and a satellite network. The server I/O interfaces 124 may be configured to support any suitable type of communication protocol as would be appreciated by one of ordinary skill in the art. In one or more embodiments, the server I/O interfaces 124 may comprise one or more sensors configured to evaluate physical phenomena surrounding the server 102, one or more of the sharding nodes 110, and/or one or more of the user devices 112. The sensors may be proximity sensors, optical sensors, and the like.

The memory 130 may be volatile or non-volatile and may comprise a read-only memory (ROM), random-access memory (RAM), ternary content-addressable memory (TCAM), dynamic random-access memory (DRAM), and static random-access memory (SRAM). The memory 130 may be implemented using one or more disks, tape drives, solid-state drives, and/or the like. The memory 130 is operable to store the instructions 132, the one or more sharding commands 134, the one or more performance thresholds 136, the one or more shards 137, the one or more sharding feedback 138 comprising the one or more sharding performances 140 of the one or more network resources 154 in the one or more one or more sharding nodes 110, the one or more access commands 142, the one or more proposed sharding strategies 144, the one or more role directories 150 comprising the one or more node profiles 152 and the one or more network resources 154 for each of the one or more sharding nodes 110, the one or more sharding operations 104, the one or more shard assignments 156, the one or more AI commands 160, the one or more ML algorithms 158 configured to train the one or more models 162, the one or more requests 164, and the one or more reports 166. The instructions 132 may comprise any suitable set of instructions, logic, rules, or code operable to execute the server processor 126.

In some embodiments, the sharding commands 134 are generated in response to receiving one or more access commands 142 configured to trigger one or more of the sharding operations 104. The sharding commands 134 may be messages, instructions, and/or triggers configured to control routing of data between one or more sharding nodes 110 and one or more user devices 112. The sharding commands 134 may be configured to account for one or more sharding operations 104 to be performed in accordance with a sharding strategy. In one or more embodiments, the sharding commands 134 may be used to guide routing of one or more requests 164 to the one or more sharding nodes 110. The sharding commands 134 may be implemented by configuring one or more of the network resources 154 to perform one or more specific data sharding operations 104 associated with a specific request 164. The sharding commands 134 may be triggers that cause the server 102 to break down one or more of the shards 137 hosted by specific network resources 154 in one or more of the sharding nodes 110, re-shard broken down versions of the one or more shards 137 into updated versions of the first network resources 154. The sharding commands 134 may be configured to reallocate sharding operations 104 in accordance with a dynamically changing sharding strategy instead of relying on lookup sharding strategies, range sharding strategies, and/or hash sharding strategies among others. In one or more embodiments, the server 102 may be configured to reduce traffic use (e.g., traffic hot spots) at any one of the sharding nodes 110.

The one or more sharding operations 104 may be one or more data exchanges performed between two or more network devices in the system 100. The network devices may comprise the server 102, one or more of the sharding nodes 110, and one or more of the user devices 112 among others. In one or more embodiments, the sharding operations 104 may be one or more operations configured to generate, retrieve, store, and/or modify shards 137 in the system 100. The sharding operations 104 may be one or more operations configured to split a larger database into smaller and more manageable pieces. These pieces may be referred to as shards 137. Each shard 137 may contain a subset of total data and operate independently, allowing for horizontal scaling and improved performance. The sharding operations 104 may comprise distributing data across multiple machines or communication devices (e.g., sharding nodes 110). This distribution may be based on one or more shard assignments 156 (e.g., as provided via a shard key) that determine how data is allocated to each shard. The shard assignments 156 may be based on various attributes such as geographic location, user identifier (ID), or time period. In some embodiments, when a request 164 is made, the server 102 may use the shard assignments 156 to locate a relevant shard 137 and direct the request 164 to an appropriate sharding node 110. The sharding operations 104 may be triggered by one or more communication operations comprising audio communications exchanged as part of audio conversations (e.g., during a telephonic call) between two or more network devices. The communication operations may be image and/or text communications exchanged as part of image-based conversations (e.g., during videocalls and/or chat exchanges) between two or more network devices.

The shards 137 may be partitioned data chunks distributed in one or more sharding nodes 110. The shards 137 may be referred to as logical shards. The sharding nodes 110 may be configured to store the shards 137. The sharding nodes 110 may be referred to as physical shards or database node. A physical shard may comprise multiple logical shards. The shards 137 may be configured to be retrieved and/or accessed by the user devices 112 in accordance with one or more sharding commands 134. Herein, the shards 137 may be assigned to specific sharding nodes 110 to reduce overall traffic at the system 100 and/or reduce traffic at one or more specific sharding nodes 110. The sharding nodes 110 may be rebalanced in real-time in accordance with current traffic and/or access patterns determined in the system 100.

The performance thresholds 136 may be one or more specific numbers and/or number ranges associated with a specific parameter and/or indicator. The performance thresholds 136 may be a specific value representing a higher boundary or a lower boundary. The performance thresholds 136 may be one or more threshold ranges comprising higher boundaries and lower boundaries. The performance thresholds 136 may be a percentage value representing a similarity and/or a difference between sharding performances 140 of one or more network resources 154 and one or more target performance values. In some embodiments, the performance thresholds 136 may incorporate the target performance values such that specific sharding performance 140a matching a specific performance threshold 136a represents that the sharding performance 140a is within a predefined tolerance and/or error with respect to the one or more target performance values. In some embodiments, the performance thresholds 136 may incorporate the target performance values such that specific sharding performance 140a that do not match the specific performance threshold 136a represents that the sharding performance 140a is within the predefined tolerance and/or error with respect to the one or more target performance values. The performance thresholds 136 may be determined based on information associated with one or more sharding operations 104 exchanged between the server 102, the one or more sharding nodes 110, and/or the one or more user devices 112. The performance thresholds 136 may be determined based on information associated with one or more communication operations exchanged between the server 102, the one or more sharding nodes 110, and/or the one or more user devices 112. The performance thresholds 136 may be determined dynamically over time. The performance thresholds 136 may be predefined and/or predetermined in accordance with information in activity associated with one or more of the sharding operations 104 and/or one or more communication operations. In some embodiments, the server 102 may be configured to calculate the performance thresholds 136 based on information obtained via the server I/O interfaces 124 and/or node interfaces 182.

The sharding feedback 138 may comprise one or more sharding performances 140. The sharding feedback 138 may comprise information provided by and/or obtained from the sharding nodes 110 during one or more sharding operations 104 and/or one or more communication operations. The server 102 may be configured to perform one or more retrieving operations configured to determine sharding performances 140 from the sharding operations 104 and generate one or more reports 166 associated with interactions of the sharding nodes 110 in the network 114. The sharding feedback 138 may be provided continuously and/or periodically over time. The sharding feedback 138 may be data indicating whether any of the sharding nodes 110 are attempting to perform one or more specific data exchange operations in the network 114. The sharding feedback 138 may be obtained via one or more communication links that identify usage of the network resources 154 based on input requests 164 related to the one or more sharding operations 104 within the network 114. The sharding feedback 138 may comprise multiple performance parameters referencing changes of the sharding performance 140 of one or more sharding nodes 110 at a specific point in time. The sharding feedback 138 may comprise multiple performance parameters referencing changes of the sharding performance 140 of one or more sharding nodes 110 over a period of time.

In one or more embodiments, the sharding feedback 138 may indicate one or more changes in the behavior and/or operations associated with one or more of the sharding nodes 110. In one or more embodiments, the sharding feedback 138 comprise information data representative on one or more communication operations performed and/or triggered by the one or more sharding nodes 110. The sharding feedback 138 may be data that represents extracted information and/or summarized information associated with one or more operations attempted and/or performed by the sharding nodes 110. In the example of FIG. 1, the sharding feedback 138 may be activation and/or status information associated with transmissions and/or exchanges of the shards 137.

In one or more embodiments, the sharding operations 104 may be one or more operations executed by the server processor 126 configured to enable data objects and/or shards 137 to be exchanged between the sharding nodes 110 and/or the server 102. In one or more embodiments, the sharding operations 104 comprise authentication operations may be configured to indicate one or more data objects (e.g., via the one or more communication operations) to be exchanged between the server 102, at least one of the sharding nodes 110, and/or the one or more user devices 112. The sharding operations 104 may be configured to generate and analyze one or more communication operations to confirm whether one or more entities associated with communication operations are legitimately associated with at least one of the sharding nodes 110. The sharding operations 104 may be one or more operations in which the server 102 is configured to confirm whether one or more communication operations belong to one or more specific user devices 112.

The one or more access commands 142 may be one or more indicators configured to provide information associated with one or more operations of the entities accessing the network 114. The access commands 142 may be stored in one or more formats. The server processor 126 may be configured to generate the one or more access commands 142 based on sharding feedback 138. In this regard, the access commands 142 may be information indicating modifications and/or assignments of network resources in the network 114. The access commands 142 may be replaced, updated, and/or modified dynamically. The access commands 142 may be replaced, updated, and/or modified periodically. The access commands 142 may comprise results of one or more operations of the processing engine configured to perform as sharding operations 104 that retrieve and analyze the sharding feedback 138. The access commands 142 may comprise one or more triggers configured to enable access between the server 102, the sharding nodes 110, and/or the user devices 112. The access commands 142 may be generated to modify routing of requests 164 in the network 114.

The one or more proposed sharding strategies 144 may be recommendations generated by the server 102 based on current performance of the network resources 154 in one or more of the sharding nodes 110. The proposed sharding strategies 144 may be sharding configuration information configured to modify one or more sharding operations 104. The proposed sharding strategies 144 may be strategies configured to modify (e.g., increase and/or reduce) a number of the network resources 154 assigned for one or more sharding nodes 110. The proposed sharding strategies 144 may be configurations to modify usage of one or more of the network resources 154 at any specific sharding node 110. For example, the proposed sharding strategies 144 may be configured to modify a number of network resources 154 assigned at one or more sharding nodes 110. The proposed sharding strategies 144 may be configured to modify usage of a portion of current network resources assigned for one or more sharding nodes 110. For example, the proposed sharding strategies 144 may be configured to modify usage of a first portion of memory resources at a specific sharding node 110a to change from storing shards 137 to assist with sharding operations 104. In any integrated system, where multiple applications interact with each other, the system 100 may thoroughly perform impact checks of any changes to operations and whether modifications are needed to ensure any change is not impacting performance of the applications upstream/downstream.

The one or more role directories 150 may comprise the one or more node profiles 152 and the one or more network resources 154 assigned for each of the node profiles 152. In one or more embodiments, the node profiles 152 may comprise multiple profiles for the sharding nodes 110. Each of the sharding nodes 110 may be associated with one or more sharding strategies. The sharding strategies may indicate that a given sharding node 110 is allowed to access one or more network resources 154 in accordance with one or more rules and policies. The sharding strategies may reference that a given sharding node 110 is allowed to perform one or more sharding operations 104 in the system 100 (e.g., provide a specific application data shard access to and/or from one of the user devices 112). To secure or protect operations of the sharding nodes 110, the sharding strategies may be assigned to a given node profile 152 in accordance with updated security information, which may provide guidance parameters to the use of the sharding strategies based at least upon corresponding rules and policies. In one or more embodiments, the one or more network resources 154 are memory resources, processing resources, and/or power resources made available to the one or more sharding nodes 110. The one or more network resources 154 may be accessed by one or more of the sharding nodes 110 based on access granted by the one or more sharding strategies. Further, the network resources 154 may be dynamically assigned, redistributed, and/or modified for different sharding nodes 110.

In some embodiments, the one or more shard assignments 156 cause additional shards 137 to be generated and/or previous shards 137 to be discarded and/or deactivated. The shard assignments 156 may cause different network resources 154 to be used to host and/or provide access for one or more shards 137. The shard assignments 156 may be configured to provide shards 137 or re-sharded versions of data to one or more sharding nodes 110. The one or more shards 137 may be accessed by one or more of the user devices 112 based on access granted by the one or more sharding strategies and/or sharding commands 134. Further, the shards 137 may be dynamically assigned, redistributed, and/or modified for different sharding nodes 110.

The requests 164 may be one or more communications configured to provide triggers in the form of communication or control signals to start operations such as fetching the instructions 132 or running one or more of the sharding operations 104. The requests 164 may provide sharding information to the server 102 to reference information to be retrieved at one or more of the shards 137. In some embodiments, the requests 164 may be configured to provide lists, security information, and configuration commands that the server 102 uses to set up sharding command 134 to route the requests 164 to one or more of the sharding nodes 110. The requests 164 may be routed based on current performance of the network resources 154 at a given sharding node 110 and/or availability at one or more of the sharding nodes 110. The requests 164 may comprise data that provides starting procedure configuration to the server 102. In one or more embodiments, the requests 164 may be optimized instructions that trigger establishing of a specific procedure in the server 102.

The one or more reports 166 may be communications or messages configured to indicate information to the server 102, one or more of the sharding nodes 110, and/or one or more of the user devices 112.

In one or more embodiments, the ML algorithms 158 may be executed by the server processor 126 to evaluate the communication operations, the sharding operations 104, and/or the sharding feedback 138. Further, the ML algorithms 158 may be configured to interpret and transform the requests 164 and/or the instructions 132 into structured data sets and subsequently stored as files or tables. The ML algorithms 158 may cleanse, normalize raw data, and derive intermediate data to generate uniform data in terms of encoding, format, and data types. The ML algorithms 158 may be executed to run user queries and advanced analytical tools on the structured data and/or the unstructured data in accordance with one or more ML models 162. The ML algorithms 158 may be configured to generate the one or more AI commands 160 based on one or more results of the testing operations. The AI commands 160 may be parameters that proactively trigger one or more of the sharding operations 104. The AI commands 160 may be combined with the existing instructions 132 to dynamically trigger and/or perform one or more data authentication operations and/or some or all of the sharding operations 104. The AI commands 160 may be configured to trigger one or more cognitive AI operations in accordance with one or more ML models 162. The ML models 162 may be trained by the one or more ML algorithms 158 based on historic information associated with any sharding operations 104 performed with the server 102.

In one or more embodiments, the databases 122 may be one or more repositories configured to store information. In one example, the server 102 may determine the server processor 126 are available (e.g., running) to perform one or more communication operations associated with a specific service (e.g., application). In another example, the server 102 may determine that a specific managed server is running to enable a testing application and/or perform the specific service upon receiving a server response indicating that a corresponding managed server is available to perform the service. The databases 122 may be configured to store one or more representations of data instead of storing coded data. In this regard, the representations may be encoded in accordance with an encoder configured to identify and/or verify exchanged information. For example, the databases 122 may comprise one or more representations of the sharding feedback 138 and/or the access commands 142. As the sharding feedback 138 is obtained, the server processor 126 may be configured to store the sharding feedback 138 in accordance with one or more encryption operations.

Sharding Node

In one or more embodiments, each of the sharding nodes 110 (e.g., the sharding node 110a or the sharding nodes 110b-110e in the node cluster 116 among others) may be any computing device configured to communicate with other devices, such as the server 102, other sharding nodes 110 in the node cluster 116, databases, and the like in the system 100. Each of the sharding nodes 110 may be configured to perform specific functions described herein and interact with the server 102, any other sharding nodes 110, and/or the user devices 112. Examples of the sharding nodes 110 comprise, but are not limited to, a database, a server, a computer, an IoT device, a storage device, or any other suitable type of device. The requests 164 may be provided by the sharding nodes 110 via one or more interfaces comprising input displays, voice microphones, or sensors capturing gestures performed by a corresponding node administrator (not shown).

The sharding nodes 110 may be hardware configured to create, transmit, and/or receive information. The sharding nodes 110 may be hardware configured to create, transmit, and/or receive the shards 137. The sharding nodes 110 may be configured as a provider node or as worker nodes. The sharding nodes 110 may be configured to receive inputs from the server 102 and/or one or more of the user devices 112, process the inputs, and generate data information or command information in response. The data information may include documents or files generated using a graphical user interface (GUI).

Referring to the sharding node 110a as a non-limiting example, the command information may include input selections/commands triggered by a user using a peripheral component or one or more node peripherals 184 (i.e., a keyboard) or an integrated input system (i.e., a touchscreen displaying the GUI). The sharding nodes 110 may be communicatively coupled to the server 102 via a network connection (i.e., the node peripherals 184). The sharding nodes 110 may transmit and receive the shards 137, data information, command information, or a combination of both to and from the server 102 via the node interfaces 182. In one or more embodiments, the sharding nodes 110 are configured to exchange data, commands, and signaling with the server 102 and/or one or more of the user devices 112. In some embodiments, the sharding nodes 110 are configured to receive at least one security system configuration from the server 102 to implement a security system at one of the sharding nodes 110.

In one or more embodiments, the node interfaces 182 may be any suitable hardware or software (e.g., executed by hardware) to facilitate any suitable type of communication in wireless or wired connections. These connections may comprise, but not be limited to, all or a portion of network connections coupled to the user devices 112, additional sharding nodes 110, the server 102, the Internet, an Intranet, a private network, a public network, a peer-to-peer network, the public switched telephone network, a cellular network, a LAN, a MAN, a WAN, and a satellite network. The node interfaces 182 may be configured to support any suitable type of communication protocol.

In one or more embodiments, the one or more node peripherals 184 may comprise audio devices (e.g., speaker, microphones, and the like), input devices (e.g., keyboard, mouse, and the like), or any suitable electronic component that may provide a modifying or triggering input to the sharding nodes 110. For example, the one or more node peripherals 184 may be speakers configured to release audio signals (e.g., voice signals or commands) during media playback operations. In another example, the one or more node peripherals 184 may be microphones configured to capture audio signals. In one or more embodiments, the one or more node peripherals 184 may be configured to operate continuously, at predetermined time periods or intervals, or on-demand.

The node processor 186 may comprise one or more processors communicatively coupled to and in signal communication with the node interfaces 182, the node peripherals 184, and the node memory 188. The node processor 186 is any electronic circuitry, including, but not limited to, state machines, one or more CPU chips, logic units, cores (e.g., a multi-core processor), FPGAs, ASICs, or DSPs. The node processor 186 may be a programmable logic device, a microcontroller, a microprocessor, or any suitable combination of the preceding. The one or more processors in the node processor 186 are configured to process data and may be implemented in hardware or software executed by hardware. For example, the node processor 186 may be an 8-bit, a 16-bit, a 32-bit, a 64-bit, or any other suitable architecture. The node processor 186 may comprise an ALU to perform arithmetic and logic operations, processor registers that supply operands to the ALU, and store the results of ALU operations, and a control unit that fetches software instructions such as node instructions 192 from the node memory 188 and executes the node instructions 192 by directing the coordinated operations of the ALU, registers, and other components via a node processing engine (not shown). The node processor 186 may be configured to execute various instructions.

The node memory 188 may comprise multiple operation data, one or more local shards 191, one or more node instructions 192, one or more node response operations 194, and one or more node monitor operations 196 associated with the server 102. The operation data may be data configured to enable one or more data processing operations such as those described in relation with the server 102. The operation data may be partially or completely different from those comprised in the memory 130. The local shards 191 may be one or more of the shards 137 described in relation with the server 102. In some embodiments, the local shards 191 may be partially or completely different from those comprised in the memory 130.

The one or more node monitor operations 196 may comprise monitoring of sharding performance 140 of one or more network resources 154 at one or more of the sharding nodes 110. The sharding performance 140 of the network resources 154 may comprise logical shard performance and physical shard performance at one or more sharding nodes 110. The one or more node monitor operations 196 may be performed by the node processor 186 and/or one or more specific hardware structures configured to perform one or more performance operations.

The one or more node response operations 194 may comprise implementing one or more sharding commands 134 by configuring one or more of the network resources 154 to perform one or more data sharding operations 104 associated with one or more requests 164. The server 102 may be configured to generate one or more responses comprising routing data referencing one or more shards 137 in an updated version of corresponding network resources 154. The one or more node response operations 194 may be performed by the node processor 186 and/or one or more specific hardware structures configured to perform one or more response operations 194.

User Device

In one or more embodiments, each of the user devices 112 (e.g., the user device 112a, the user device 112b, and the user device 112c in the user device group 118) may be any computing device configured to communicate with other devices, such as the server 102, other user devices 112 in the user device group 118, databases, and the like in the system 100. Each of the user devices 112 may be configured to perform specific functions described herein and interact with the server 102 and/or any other user devices 112. Examples of the user devices 112 comprise, but are not limited to, a laptop, a computer, a smartphone, a tablet, a smart device, an IoT device, a simulated reality device, an augmented reality device, or any other suitable type of device. The requests 164 may be provided by the user devices 112 via one or more interfaces comprising input displays, voice microphones, or sensors capturing gestures performed by the corresponding users 120.

The user devices 112 may be hardware configured to create, transmit, and/or receive information. The user devices 112 may be configured as a provider node or as worker nodes. The user devices 112 may be configured to receive inputs from a user, process the inputs, and generate data information or command information in response. The data information may include documents or files generated using a graphical user interface (GUI). The user devices 112 may comprise at least one device memory, at least one device processor, and/or at least one or more device peripherals.

Network

The network 114 facilitates communication between and amongst the various devices of the system 100. The network 114 may be any suitable network operable to facilitate communication between the server 102 and the user devices 112 of the system 100. The network 114 may include any interconnecting system capable of transmitting audio, video, signals, data, data packets, messages, or any combination of the preceding. The network 114 may include all or a portion of a public switched telephone network (PSTN), a public or private data network, a LAN, a MAN, a WAN, a local, regional, or global communication or computer network, such as the Internet, a wireline or wireless network, an enterprise intranet, or any other suitable communication link, including combinations thereof, operable to facilitate communication between the devices.

Operational Flow to Dynamically Modify
Availability of Network Resources

FIG. 2 shows an operational flow 200 in which the system 100 of FIG. 1 is configured to perform one or more sharding operations 104, in accordance with one or more embodiments. In FIG. 2, the operational flow 200 comprises multiple operations 202-238. The operational flow 200 may be performed between the server 102, one or more sharding nodes 110, and/or one or more user devices 112 to perform one or more sharding operations 104. The operational flow 200 shows one or more user devices 112 represented by the user device 112a and the user device 112c, the server 102, and one or more sharding nodes 110 represented by the sharding node 110a, the sharding node 110b, and the sharding node 110e. In some embodiments, while specific numbers of the user devices 112 and/or the sharding nodes 110 are shown, less or more network devices may be configured to perform one or more of the operations 202-238.

The operational flow 200 may start at operation 202, where one or more of the user devices 112 are configured to generate one or more requests 164 for data shards 137. In FIG. 2, while the user devices 112a-112c are shown, less or more user devices 112 may be configured to perform similar operations. Further, while the user device 112a is shown interacting with the server 102 and one or more of the sharding nodes 110, the server 102 is configured to receive and/or process several (e.g., multiple) requests 164. At operation 204, the user device 112a is shown requesting a data shard 137 to the server 102. A request 164a from the user device 112a may be received by the server 102 during a reception window. The request 164a from the user device 112a may be received by the server 102 outside of a reception window. The request 164a may be a data shard request for one or more shards 137 associated with one or more pieces and/or portions of information.

At operation 206, one or more of the sharding nodes 110a-110e may be configured to perform one or more sharding operations 104 based on one or more existing sharding commands 134. In FIG. 2, while the sharding nodes 110a-110e are shown, less or more sharding nodes 110 may be configured to perform similar operations. Further, while the sharding node 110a, the sharding node 110b, and the sharding node 110e are shown performing one or more of the operations 208-238, one or more of the sharding nodes 110 may be configured to perform one or more of the operations 208-238. At operation 208, the sharding node 110a is shown monitoring a sharding performance 140a at the sharding node 110a over a first period of time. At operation 210, the sharding node 110b is shown monitoring a sharding performance 140b at the sharding node 110b over a second period of time. At operation 212, the sharding node 110c is shown monitoring a sharding performance 140c at the sharding node 110c over a first period of time. The first period of time, the second period of time, and the third period of time may be a same time period. The first period of time, the second period of time, and the third period of time may be different time periods. At operation 214, the sharding node 110a is configured to transmit the sharding performance 140a (e.g., node performance as part of sharding feedback 138) to the server 102. At operation 216, the sharding node 110b is configured to transmit the sharding performance 140b to the server 102. At operation 218, the sharding node 110c is configured to transmit the sharding performance 140c (e.g., node performance) to the server 102. The sharding performance 140a, the sharding performance 140b, and the sharding performance 140c may be transmitted to the server 102 at a same time. The sharding performance 140a, the sharding performance 140b, and the sharding performance 140c may be transmitted to the server 102 at different times.

The operational flow 200 continues at operation 220, where the server 102 is configured to query router layer operations (e.g., assign sharding operations 104) based on current sharding strategy. At operation 222, the server 102 is configured to generate one or more proposed sharding strategies 144 based on the sharding performance 140a-140c received from the sharding node 110a, the sharding node 110b, and the sharding node 110e, respectively. The server 102 may be configured to generate the proposed sharding strategies 144 based on one or more additional sharding feedback 138 received from additional sharding nodes 110. Herein, the server 102 may be configured to update one or more of the existing sharding commands 134 based on an analysis of the sharding performances 140a-140c received in sharding feedback 138. The server 102 may be configured to execute the one or more ML algorithms 158 to perform one or evaluation operations of the sharding feedback 138. At operations 224-228, the server 102 may be configured to transmit updated versions of the sharding commands 134 to one or more of the sharding nodes 110. At operation 224, the server 102 transmits the updated sharding commands 134 to the sharding node 110a. At operation 226, the server 102 transmits the updated sharding commands 134 to the sharding node 110b. At operation 228, the server 102 transmits the updated sharding commands 134 to the sharding node 110e. Each of the sharding nodes 110 may be configured to implement the updated sharding commands 134. In some embodiments, the updating sharding commands 134 may comprise new configurations that modify handling, routing, and/or processing of shards 137 and/or sharding operations 104 at each of the sharding nodes 110.

At operation 230, the server 102 and the one or more sharding nodes 110 are configured to route the request 164a to the one or more sharding nodes 110 in accordance with the updated versions of the sharding commands 134. Herein, the server 102 and the sharding nodes 110 may be configured to route the request 164a to one or more specific sharding nodes 110. At operation 232, the sharding nodes 110 may be configured to perform one or more sharding operations 104 based on the updated sharding commands 134.

The operational flow 200 may conclude at operations 234-238, where one or more of the sharding nodes 110 may be configured to transmit one or more generated shards 137 to the user device 112a. In some embodiments, the sharding nodes 110 may be configured to transmit the one or more generated shards 137 to the user device via the server 102. At operation 234, the sharding node 110a may be configured to send a shard 137a to the user device 112a. At operation 236, the sharding node 110b may be configured to send a shard 137b to the user device 112a. At operation 238, the sharding node 110e may be configured to send a shard 137c to the user device 112a. The operations 234-238 may be performed at a same time and/or at different times.

In one or more embodiments, the server 102 is configured to dynamically update the sharding commands 134 for one or more of the sharding nodes 110 based on ongoing sharding feedback 138 received from the sharding nodes 110. At a starting state, the user devices 112 may be configured to generate one or more data access requests 164. The requests 164 may be received by the server 102. The server 102 may be configured to query a router layer based on an existing sharding strategy and/or in accordance with one or more sharding commands 134. In a case where traffic at the sharding node 110a causes reduce performance at of one or more network resources 154a at the sharding node 110a due to hotspots and/or higher/heavy processing loads, the sharding node 110a may be configured to transmit a sharding feedback 138 to the server 102 comprising a sharding performance 140a of the network resources 154a referencing that the network resources 154 are currently at capacity, generally referencing that the sharding node 110a is in the process of being at capacity, and/or developing a hotspot. As described above, the sharding node 110a is configured to monitor continuously and/or periodically physical shard health and/or logical shard health at the sharding node 110a. The sharding feedback 138 may be configured to provide the physical shard health and/or logical shard health of each of the network resources 154a at the sharding node 110a over time.

At this point, the server 102 may be configured to receive the sharding feedback 138 and evaluate the sharding feedback 138 by executing the one or more ML algorithms 158 to determine whether to re-shard one or more shards 137a currently hosted at the sharding node 110a to prevent, inhibit, and/or eliminate hotspots at the sharding node 110. The ML algorithms 158 may evaluate the sharding feedback 138 in accordance with one or more ML models 162. The ML models 162 may be trained by taking into account historical data patterns associated with the sharding node 110a, historical data patterns associated with one or more additional sharding nodes 110, one or more performance databases, one or more existing and/or historical hardware configurations for one or more sharding nodes 110, one or more network configurations to perform one or more communication operations in the system 100, and/or one or more sharding mechanisms and/or protocols implemented in the system 100. Herein, the server 102 may be configured to calculate one or more new/proposed sharding strategies 144 that may be configured to break down the shards 137 at sharding nodes 110 having heavier traffic and re-shard the broken-down shards 137 (e.g., broken down versions of the shards 137) for one or more overloaded sharding nodes 110. The server 102 may be configured to instruct one or more of the sharding nodes 110 to implement one or more updated sharding commands 134 and/or proposed sharding strategies 144. In some embodiments, the server 102 may update sharding strategies for a specific sharding node 110a while maintaining sharding strategies at the rest of sharding nodes 110b-110e. Further, the server 102 may update sharding strategies multiple sharding nodes 110 while maintaining sharding strategies at additional sharding nodes 110.

In one or more embodiments, the sharding nodes 110 may be configured to implements one or more new (e.g., target) sharding strategies 144 recommended by the server 102. In this case, a sharding node 110a may be configured to implement the new/target sharding strategies 144 by breaking down a first logical shard into two different shards, namely, the first logical shard and a second logical shard. Herein, the sharding node 110 may be the first logical shard that, by implementing the new/target sharding strategies 144, scales out horizontally to copy one or more network resources 154a onto a new sharding node 110b comprising one or more network resources 154b. Herein, the proposed strategies 144 may be to cause the sharding node 110a to duplicate itself to handle a target amount of traffic. The data rebalancing between the first logical shard and the second logical shard may be confined locally to the sharding node 110a. Herein, this approach enables a load in the first logical shard to be distributed and hence, a hotspot the sharding node 110a may be rectified. In some embodiments, the operational flow 200 enables updated nodes in a distributed database to self-organize for more efficient data access. A node responder in the sharding node 110a may update metadata in a query router in the server 102 with updated sharding strategies. The operational flow 200 may continue and the server 102 may be configured to continuously and/or periodically grow to gain more contextual information relevant to stored data set, data access patterns, and the like to give more refined and optimized shard ensemble operation recommendations over time.

In one or more embodiments, the server 102 is configured to perform one or more ensemble operations to determine a sharding strategy at node level based on types of data held and data access patterns in the system 100. The ML algorithms 158 are configured to be executed to perform one or more of the ensemble operations. The ML algorithms 158 may be trained performance data at one or more of the sharding nodes 110. Over time, the sharding nodes 110 may be able to track and/or monitor data access patterns, service level agreement (SLA) metrics in terms of throughput and latency, CPU cycles, and the like. The sharding nodes 110 may be configured to report anomalies detected in the form of changes in the data access patterns, declining SLA metrics, hotspot development due to greater number of CPU cycles, and the like to the server 102 which comprises trained AI and/or ML models 162 on various datasets, data access patterns, hardware configurations for a node hosting the data, network configurations for the system, different sharding mechanisms, and the like. The server 102 may be configured to implement the ML algorithms 158, the AI commands 160, and the one or more models 162 as an AI-based analyzer configured to understand whether a particular sharded node and/or sharding node 110a is facing an imbalanced load or developing into a hotspot and/or heavy traffic load. Once identified, the server 102 may be configured to identify a new sharding strategy based on trained intelligence and communicate back to the sharding node 110a. The sharding node 110a may be configured to commence work of resharding and rebalancing of the data (e.g., the shards 137). The server 102 may also work out updated sharding strategies for sharding nodes 110 containing any replicas, if needed. Once the update is complete, corresponding metadata based on updated sharding mechanisms may be passed onto a query router (e.g., in the server 102) for subsequent data access. As the process continues and data grows, the models 162 may continue to get trained on current data to gain more contextual information and perform more refined and effective operations in the system 100. The models 162 may be trained based on a current structure of the sharding nodes 1210 and/or the system 100, one or more SLAs to satisfy, and/or one or more data access patterns. The current infrastructure of the sharding nodes 110 and/or the system 100 may comprise CPU (e.g., processing resources) usage of the sharding nodes 110, disk (e.g., memory resources) usage of the sharding nodes 110, and/or network bandwidth available to the sharding nodes 110. The SLA to satisfy may comprise throughput of queries (e.g., requests 164), response time to the queries, and/or latency associated with responses to the requests 164. The data access patterns may comprise a first number of requests (e.g., a daily average among other measurements), a second number of requests (e.g., peak volume of shards 137 at the sharding node 110a), peak volume time span, incoming query details, and/or read and write request distribution among others.

In one or more embodiments, the server 102 is configured to implement an architecture that supports hybrid sharding mechanisms tailored for individual nodes resulting in shard ensemble operations for a decentralized data system. In some embodiments, while performing a shard optimization (e.g., modifying the system to meet target performance operations), the server 102 may also take care of intrinsic differences in read and write-based workloads to ensure optimal usage of available compute capabilities of infrastructure available to the sharding node 110a. Since the optimization works at node level, rebalancing of the data may happen at a logical shard level only and not at a level of physical shard. Thereby, ensuring that a network bandwidth is not wasted for data movement across nodes as part of rebalancing operations. For example, a sharding node comprising multiple logical shards may be modified to increase or reduce the logical shards in the system 100. The server 102 that governs this hybrid sharding mechanism may ensure that a system may dynamically adapt to varying data access patterns over time and ensure that the models 162 continuously learn and improve by gaining contextual information from the data.

Example Process to Dynamically Modify
Availability of Network Resources

FIG. 3 illustrates an example flowchart of a process 300 configured to dynamically modify availability of network resources, in accordance with one or more embodiments. Modifications, additions, or omissions may be made to the process 300. The process 300 may comprise more, fewer, or other operations than those shown in FIG. 3. For example, operations may be performed in parallel or in any suitable order. While at times discussed as the server 102, the sharding nodes 110, or components of any of thereof performing operations described in operations 302-330 in the process 300, any suitable system or components of the system 100 may perform one or more operations of the process 300. For example, one or more operations of the process 300 may be implemented, at least in part, in the form of instructions 132 of FIG. 1, stored on non-transitory, tangible, machine-readable media (e.g., a non-transitory computer-readable medium such as memory 130 of FIG. 1) that when run by one or more processors (e.g., the server processor 126 of FIG. 1) may cause the one or more processors to perform operations described in operations 302-330.

The process 300 starts at operation 302, where the server 102 is configured to receive a request 164a for data sharding operations 104 from a user device 112a. At operation 304, the server 102 is configured to determine a sharding node 110a comprising multiple network resources 154a configured to create a response to the request 164a. At operation 306, the server 102 is configured to receive sharding feedback 138a from the sharding node 110a. The sharding feedback 138a may be representative of a performance of the network resources 154a at the sharding node 110a prior to receiving the request 164a. At operation 308, the server 102 is configured to execute one or more of the ML algorithms 158a to determine whether the performance (e.g., reported sharding performance 140a) of the network resources 154a matches at least one or the performance thresholds 136. The ML algorithm 158a may be configured, when executed, to evaluate data in accordance with one or more machine learning models 162.

At operation 310, the server 102 is configured to determine whether the collected performance matches one or more performance thresholds 136. If the server 102 determines that the collected performance does not match one or more performance thresholds 136 (e.g., NO), the process 300 proceeds to operation 322. The process 300 may conclude at operation 322, where the server 102 is configured to generate a proposed sharding strategy (e.g., one or more of the proposed sharding strategies 144) to increase the network resources 154a at the sharding node 110a. If the server 102 determines that the collected performance matches one or more performance thresholds 136 (e.g., YES), the process 300 proceeds to operation 312. At operation 312, the server 102 is configured to route the request 164a to the sharding node 110a using existing sharding commands 134.

The process 300 may end at operations 324-330, where the server 102 may be configured to dynamically update sharding commands 134 at the sharding nodes 110 At operation 324, the server 102 is configured to provide the proposed sharding strategy to the sharding node 110a for implementation. At operation 326, the server 102 is config- ured to receive an access command 142a referencing that the sharding node 110a implemented the proposed sharding strategy. At operation 328, the server 102 is configured to generate multiple sharding commands 134 configured to control routing of data between the sharding node 110a and the user device 112a in accordance with the proposed sharding strategy. In response to receiving the access com- mand 142a, the server 102 may be configured to generate one or more sharding commands 134 configured to control routing of data between the sharding node 110a and the user device 112a. The sharding commands 134 may be updated to account for the proposed sharding strategy. At operation 330, the server 102 is configured to route the request 164a to the sharding node 110 using the sharding commands 134.

Scope of the Disclosure

While several embodiments have been provided in the present disclosure, it should be understood that the disclosed systems and methods might be embodied in many other specific forms without departing from the spirit or scope of the present disclosure. The present examples are to be considered as illustrative and not restrictive, and the inten- tion is not to be limited to the details given herein. For example, the various elements or components may be com- bined or integrated with another system or certain features may be omitted, or not implemented.

In addition, techniques, systems, subsystems, and meth- ods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or interme- diate component whether electrically, mechanically, or oth- erwise. Other examples of changes, substitutions, and altera- tions are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An apparatus, comprising:
a memory operable to store:
a machine learning algorithm configured to modify one or more sharding operations in accordance with one or more machine learning models; and
at least one processor communicatively coupled to the memory and configured to:
receive a first request for first data sharding operations from a user device;

determine a first node comprising a first plurality of network resources configured to create a first response to the first request;

receive first sharding feedback from the first node, the first sharding feedback being representative of a first performance of the first plurality of network resources at the first node prior to receiving the first request;

execute the machine learning algorithm to:
determine whether the first performance of the first plurality of network resources matches a pre- defined performance threshold;

in response to determining that the first performance of the first plurality of network resources does not match the predefined performance threshold, gen- erate a first proposed sharding strategy to increase the first plurality of network resources at the first node; and provide the first proposed sharding strategy to the first node for implementation;

receive a first access command referencing that the first node implemented the first proposed sharding strat- egy;

in response to receiving the first access command, generate a plurality of sharding commands config- ured to control routing of data between the first node and the user device, the plurality of sharding com- mands accounting for the first proposed sharding strategy; and route the first request to the first node using the plurality of sharding commands.

2. The apparatus of claim 1, wherein the at least one processor is further configured to:

receive a second request for second data sharding opera- tions from the user device;

determine a second node comprising a second plurality of network resources configured to create a second response to the second request;

receive second sharding feedback from the second node, the second sharding feedback being representative of a second performance of the second plurality of network resources at the second node prior to receiving the second request;

execute the machine learning algorithm to:
determine whether the second performance of the sec- ond plurality of network resources matches the pre- defined performance threshold;

in response to determining that the second performance of the second plurality of network resources does not match the predefined performance threshold, gener- ate a second proposed sharding strategy to increase the second plurality of network resources at the second node; and provide the second proposed sharding strategy to the second node for implementation;

receive a second access command referencing that the second node implemented the second proposed shard- ing strategy;

in response to receiving the second access command, update the plurality of sharding commands to account for the second proposed sharding strategy; and route the second request to the second node using an updated version of the plurality of sharding commands.

3. The apparatus of claim 1, wherein the at least one processor is further configured to:

receive a second request for second data sharding opera- tions from the user device;

determine a plurality of nodes comprising a second node comprising a second plurality of network resources and a third node comprising a third plurality of network resources configured to create a second response to the second request;

receive second sharding feedback from the second node, the second sharding feedback being representative of a second performance of the second plurality of network resources at the second node prior to receiving the second request;

receive third sharding feedback from the third node, the third sharding feedback being representative of a third performance of the third plurality of network resources at the third node prior to receiving the second request;

execute the machine learning algorithm to:

determine whether the second performance of the second plurality of network resources matches the predefined performance threshold;

determine whether the third performance of the third plurality of network resources matches the predefined performance threshold;

in response to determining that the second performance of the second plurality of network resources matches the predefined performance threshold and that the third performance of the third plurality of network resources does not match the predefined performance threshold, generate a second proposed sharding strategy to reduce the second plurality of network resources at the second node and increase the third plurality of network resources at the third node; and provide the second proposed sharding strategy to the plurality of nodes for implementation;

receive a second access command referencing that the second node implemented the second proposed sharding strategy;

receive a third access command referencing that the third node implemented the second proposed sharding strategy;

in response to receiving the second access command and the third access command, update the plurality of sharding commands to account for the second proposed sharding strategy; and route the second request to the plurality of nodes using an updated version of the plurality of sharding commands.

4. The apparatus of claim 1, wherein the first node comprises at least one node processor configured to:

monitor the first performance of the first plurality of network resources over time, the first performance of the first plurality of network resources comprising logical shard performance and physical shard performance at the first node;

implement the plurality of sharding commands by configuring the first plurality of network resources to perform the first data sharding operations associated with the first request; and in response of receiving the first request, generate the first response comprising routing data referencing one or more shards in an updated version of the first plurality of network resources.

5. The apparatus of claim 4, wherein implementing the plurality of sharding commands comprise:

breaking down the one or more shards hosted by the first plurality of network resources; and re-sharding broken down versions of the one or more shards into the updated version of the first plurality of network resources.

6. The apparatus of claim 4, wherein the logical shard performance comprises information associated with one or more data access patterns at the first node.

7. The apparatus of claim 4, wherein the physical shard performance comprises information associated with current infrastructure of the first node.

8. A method, comprising:

receiving a first request for first data sharding operations from a user device;

determining a first node comprising a first plurality of network resources configured to create a first response to the first request;

receiving first sharding feedback from the first node, the first sharding feedback being representative of a first performance of the first plurality of network resources at the first node prior to receiving the first request;

executing a machine learning algorithm to perform one or more operations, comprising:

determining whether the first performance of the first plurality of network resources matches a predefined performance threshold;

in response to determining that the first performance of the first plurality of network resources does not match the predefined performance threshold, generating a first proposed sharding strategy to increase the first plurality of network resources at the first node; and providing the first proposed sharding strategy to the first node for implementation;

receiving a first access command referencing that the first node implemented the first proposed sharding strategy;

in response to receiving the first access command, generating a plurality of sharding commands configured to control routing of data between the first node and the user device, the plurality of sharding commands accounting for the first proposed sharding strategy; and routing the first request to the first node using the plurality of sharding commands.

9. The method of claim 8, further comprising:

receiving a second request for second data sharding operations from the user device;

determining a second node comprising a second plurality of network resources configured to create a second response to the second request;

receiving second sharding feedback from the second node, the second sharding feedback being representative of a second performance of the second plurality of network resources at the second node prior to receiving the second request;

executing the machine learning algorithm to perform one or more additional operations, comprising:

determining whether the second performance of the second plurality of network resources matches the predefined performance threshold;

in response to determining that the second performance of the second plurality of network resources does not match the predefined performance threshold, generating a second proposed sharding strategy to increase the second plurality of network resources at the second node; and providing the second proposed sharding strategy to the second node for implementation;

receiving a second access command referencing that the second node implemented the second proposed sharding strategy;

in response to receiving the second access command, updating the plurality of sharding commands to account for the second proposed sharding strategy; and routing the second request to the second node using an updated version of the plurality of sharding commands.

10. The method of claim 8, further comprising:

receiving a second request for second data sharding operations from the user device;

determining a plurality of nodes comprising a second node comprising a second plurality of network resources and a third node comprising a third plurality of network resources configured to create a second response to the second request;

receiving second sharding feedback from the second node, the second sharding feedback being representative of a second performance of the second plurality of network resources at the second node prior to receiving the second request;

receiving third sharding feedback from the third node, the third sharding feedback being representative of a third performance of the third plurality of network resources at the third node prior to receiving the second request;

executing the machine learning algorithm to perform one or more additional operations, comprising:

determining whether the second performance of the second plurality of network resources matches the predefined performance threshold;

determining whether the third performance of the third plurality of network resources matches the predefined performance threshold;

in response to determining that the second performance of the second plurality of network resources matches the predefined performance threshold and that the third performance of the third plurality of network resources does not match the predefined performance threshold, generating a second proposed sharding strategy to reduce the second plurality of network resources at the second node and increase the third plurality of network resources at the third node; and providing the second proposed sharding strategy to the plurality of nodes for implementation;

receiving a second access command referencing that the second node implemented the second proposed sharding strategy;

receiving a third access command referencing that the third node implemented the second proposed sharding strategy;

in response to receiving the second access command and the third access command, updating the plurality of sharding commands to account for the second proposed sharding strategy; and routing the second request to the plurality of nodes using an updated version of the plurality of sharding commands.

11. The method of claim 8, wherein the first node comprises at least one node processor configured to:

monitoring the first performance of the first plurality of network resources over time, the first performance of the first plurality of network resources comprising logical shard performance and physical shard performance at the first node;

implementing the plurality of sharding commands by configuring the first plurality of network resources to perform the first data sharding operations associated with the first request; and in response of receiving the first request, generating the first response comprising routing data referencing one or more shards in an updated version of the first plurality of network resources.

12. The method of claim 11, wherein implementing the plurality of sharding commands comprise:

breaking down one or more shards hosted by the first plurality of network resources; and re-sharding broken down versions of the one or more shards into the updated version of the first plurality of network resources.

13. The method of claim 11, wherein the logical shard performance comprises information associated with one or more data access patterns at the first node.

14. The method of claim 11, wherein the physical shard performance comprises information associated with current infrastructure of the first node.

15. A non-transitory computer-readable medium storing instructions that when executed by a processor cause the processor to:

receive a first request for first data sharding operations from a user device;

determine a first node comprising a first plurality of network resources configured to create a first response to the first request;

receive first sharding feedback from the first node, the first sharding feedback being representative of a first performance of the first plurality of network resources at the first node prior to receiving the first request;

execute a machine learning algorithm to:

determine whether the first performance of the first plurality of network resources matches a predefined performance threshold;

in response to determining that the first performance of the first plurality of network resources does not match the predefined performance threshold, generate a first proposed sharding strategy to increase the first plurality of network resources at the first node; and provide the first proposed sharding strategy to the first node for implementation;

receive a first access command referencing that the first node implemented the first proposed sharding strategy;

in response to receiving the first access command, generate a plurality of sharding commands configured to control routing of data between the first node and the user device, the plurality of sharding commands accounting for the first proposed sharding strategy; and route the first request to the first node using the plurality of sharding commands.

16. The non-transitory computer-readable medium of claim 15, wherein, when executed by the processor, the instructions further cause the processor to:

receive a second request for second data sharding operations from the user device;

determine a second node comprising a second plurality of network resources configured to create a second response to the second request;

receive second sharding feedback from the second node, the second sharding feedback being representative of a second performance of the second plurality of network resources at the second node prior to receiving the second request;

execute the machine learning algorithm to:

determine whether the second performance of the second plurality of network resources matches the predefined performance threshold;

in response to determining that the second performance of the second plurality of network resources does not match the predefined performance threshold, generate a second proposed sharding strategy to increase the second plurality of network resources at the second node; and provide the second proposed sharding strategy to the second node for implementation;

receive a second access command referencing that the second node implemented the second proposed sharding strategy;

in response to receiving the second access command, update the plurality of sharding commands to account for the second proposed sharding strategy; and route the second request to the second node using an updated version of the plurality of sharding commands.

17. The non-transitory computer-readable medium of claim 15, wherein, when executed by the processor, the instructions further cause the processor to:

receive a second request for second data sharding operations from the user device;

determine a plurality of nodes comprising a second node comprising a second plurality of network resources and a third node comprising a third plurality of network resources configured to create a second response to the second request;

receive second sharding feedback from the second node, the second sharding feedback being representative of a second performance of the second plurality of network resources at the second node prior to receiving the second request;

receive third sharding feedback from the third node, the third sharding feedback being representative of a third performance of the third plurality of network resources at the third node prior to receiving the second request;

execute the machine learning algorithm to:

determine whether the second performance of the second plurality of network resources matches the predefined performance threshold;

determine whether the third performance of the third plurality of network resources matches the predefined performance threshold;

in response to determining that the second performance of the second plurality of network resources matches the predefined performance threshold and that the third performance of the third plurality of network resources does not match the predefined performance threshold, generate a second proposed sharding strategy to reduce the second plurality of network resources at the second node and increase the third plurality of network resources at the third node; and provide the second proposed sharding strategy to the plurality of nodes for implementation;

receive a second access command referencing that the second node implemented the second proposed sharding strategy;

receive a third access command referencing that the third node implemented the second proposed sharding strategy;

in response to receiving the second access command and the third access command, update the plurality of sharding commands to account for the second proposed sharding strategy; and route the second request to the plurality of nodes using an updated version of the plurality of sharding commands.

18. The non-transitory computer-readable medium of claim 15, wherein the first node comprises at least one node processor configured to:

monitor the first performance of the first plurality of network resources over time, the first performance of the first plurality of network resources comprising logical shard performance and physical shard performance at the first node;

implement the plurality of sharding commands by configuring the first plurality of network resources to perform the first data sharding operations associated with the first request; and in response of receiving the first request, generate the first response comprising routing data referencing one or more shards in an updated version of the first plurality of network resources.

19. The non-transitory computer-readable medium of claim 18, wherein the logical shard performance comprises information associated with one or more data access patterns at the first node.

20. The non-transitory computer-readable medium of claim 18, wherein the physical shard performance comprises information associated with current infrastructure of the first node.

* * * * *